(12) United States Patent
Fujita et al.

(10) Patent No.: US 8,547,930 B2
(45) Date of Patent: Oct. 1, 2013

(54) BASE STATION APPARATUS, MOBILE COMMUNICATION SYSTEM AND PRIORITY SETTING METHOD

(75) Inventors: Hiroshi Fujita, Kawasaki (JP); Yoshiharu Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 11/826,500

(22) Filed: Jul. 16, 2007

(65) Prior Publication Data

US 2007/0265010 A1  Nov. 15, 2007

Related U.S. Application Data

(63) Continuation of application No. PCT/JP2005/000959, filed on Jan. 26, 2005.

(51) Int. Cl.
*H04W 4/00* (2009.01)

(52) U.S. Cl.
USPC .. 370/331; 370/328; 370/395.21; 370/395.42; 370/455; 455/441; 455/436; 455/435.3; 455/452.2

(58) Field of Classification Search
USPC .............. 455/436–444, 435.3, 452.1–453; 370/328, 331–333, 395.21, 395.4–395.43, 370/431, 455

See application file for complete search history.

(56) References Cited

U.S. PATENT DOCUMENTS

| 5,862,485 | A | 1/1999 | Linneweh, Jr. | |
| 6,671,507 | B1* | 12/2003 | Vinck | 455/411 |
| 6,725,052 | B1* | 4/2004 | Raith | 455/518 |
| 2003/0037146 | A1 | 2/2003 | O'Neill | |
| 2005/0227694 | A1* | 10/2005 | Hayashi | 455/436 |
| 2006/0025151 | A1* | 2/2006 | Karaoguz et al. | 455/455 |
| 2006/0039332 | A1* | 2/2006 | Kotzin | 370/338 |
| 2006/0233144 | A1* | 10/2006 | Matsumoto | 370/338 |

FOREIGN PATENT DOCUMENTS

| EP | 1411740 A1 | 4/2004 |
| EP | 1439726 A1 | 7/2004 |
| JP | 2002-525935 A | 8/2002 |
| JP | 2003-110574 A | 4/2003 |
| JP | 2004-254278 A | 9/2004 |
| JP | 2004-304399 A | 10/2004 |
| WO | 0016577 A1 | 3/2000 |

OTHER PUBLICATIONS

The First Office Action dated Jun. 4, 2010 issued in the corresponding Chinese Application No. 200580047266.0.
Supplemental European Search Report dated Sep. 4, 2012 received in 05704102.22/1249/1843490 PCT/JP32005000959.

* cited by examiner

*Primary Examiner* — Marcos Torres
(74) *Attorney, Agent, or Firm* — Smith, Gambrell & Russell, LLP (57) ABSTRACT

A problem is to provide a base station apparatus, a mobile communication system and a priority setting method for easing abrupt decrease of the transmission speed when performing handover between wireless systems in which transmission speeds are different, and the problem is solved by providing priority higher than normal to a terminal that comes from a second wireless system, by handover, in which transmission speed is greater than a first wireless system.

6 Claims, 6 Drawing Sheets

BASE STATION APPARATUS, MOBILE COMMUNICATION SYSTEM AND PRIORITY SETTING METHOD

CROSS-REFERENCE TO RELATED APPLICATION

This application is a U.S. continuation application filed under 35 USC 111(a) claiming benefit under 35 USC 120 and 365(c) of PCT application PCT/JP2005/000959, filed on Jan. 26, 2005, the entire contents of which are hereby incorporated by reference.

TECHNICAL FIELD

The present invention relates to a base station apparatus, a terminal, a mobile communication system and a priority setting method. More particularly, the present invention relates to a mobile communication system including wireless systems having different transmission speeds, a base station apparatus included in the mobile communication system, a terminal performing handover between wireless systems having different transmission speeds, and a priority setting method for setting priority provided to the terminal.

BACKGROUND ART

In recent years, studies are performed for interconnecting wireless systems using different techniques to provide an environment for performing communications in various places without being fixed to a wireless system. As an example of the communication environment that is not fixed to a wireless system, there is a mobile communication system in which a W-CDMA (Wideband Code Division Multiple Access) system and a wireless LAN (Local Area Network) system are interconnected.

Here, the W-CDMA system and the wireless LAN system are compared in terms of communication area. As to the W-CDMA system, since a cell radius of a base station is so wide to be several kilometers and communication is continued even though moving over base stations, a service area can be largely widened.

On the other hand, as to the wireless LAN system complying with the IEEE802.11 standard, a communication range of an access point is so narrow to be several tens to several hundreds meters, and handover between access points is not defined. Handover is operation for automatically switching connecting access points when a terminal performs communication while moving. Therefore, as to the wireless LAN system, the terminal cannot move between the access points while performing communication so that the service area cannot be largely widened.

Next, the W-CDMA system and the wireless LAN system are compared in terms of transmission speed. As to a wireless LAN system complying with the IEEE802.11a and g standards, the maximum transmission speed is 54 Mbps which is higher than the transmission speed 14.4 Mbps of the W-CDMA system.

Therefore, in a mobile communication system in which the W-CDMA system and the wireless LAN system are interconnected, optimal communication can be performed taking advantage of the merit of the wireless system in which different techniques are used, in which the W-CDMA system is used while moving at high speed and the wireless LAN system is used when performing high speed communication in a static state, for example.

In addition, in a mobile communication system, packet communication is performed for example. In the packet communication, a scheduler is used for multiplexing many packets into limited wireless resources. In the packet communication, in order to support services, which should satisfy strict delay requirement, such as a voice service and a real time communication service and the like, priorities are provided for each service or each terminal to perform scheduling according to the priorities.

In the non-patent document 1, procedures and a system are disclosed for performing handover and the like between a wireless LAN system and a UMTS (Universal Mobile Telecommunications System). In the non-patent document 2, a terminal is disclosed for performing handover between different types of wireless access networks (RAN). The patent document 1 discloses a wireless communication system that changes priorities of packets of a newcomer terminal that performs handover into a new service area and an old terminal of the service area according to a predetermined definition.

[Patent document 1] Japanese Laid-Open Patent Application No. 2003-110574.
[Non patent document 1] UMA-Unlicensed Mobile Access (UMA) technology (http://www.umatechnology.org/) UMA User Perspective (Stage 1) R1.0.0
[Patent document 2] IEICE General Conference, B-5-133, RAN overlay type MIRAI system, 2003

DISCLOSURE OF THE INVENTION

Problem to be Solved by the Invention

Seamless handover between wireless systems is important for performing communications constantly by interconnecting wireless systems in which different techniques are used. However, when performing handover between wireless systems in which transmission speeds are different, a terminal that is connected to a wireless system in which transmission speed is high before handover suffers abrupt decrease of the transmission rate after performing handover into a wireless system in which transmission speed is low.

For example, when performing handover from the wireless LAN system complying with the IEEE802.11a, g standard to the W-CDMA system, there is a difference of 3.75 times (54 Mbps/14.4 Mbps) as to the maximum transmission speed. In addition, generally, propagation environment for a terminal performing handover is bad, and wireless resources are assigned by a scheduler such that priority of the terminal residing in the bad propagation environment is lowered. Therefore, transmission speed of the terminal performing handover from a wireless system in which transmission speed is high to a wireless system in which transmission speed is low is abruptly decreased.

Delay increases as the transmission speed is lowered. Therefore, applications susceptible to fluctuations of delay and services (game, network trading and the like) where large delay becomes a problem suffer critical effects. Thus, there is a problem in that abrupt decrease of the transmission rate should be avoided.

The present invention is contrived in view of the above-mentioned points, and an object is to provide a base station apparatus, a mobile communication system and a priority setting method for easing abrupt decrease of the transmission speed when performing handover between wireless systems in which transmission speeds are different.

Means for Solving the Problem

For solving the problem, the present invention is a base station apparatus included in a first wireless system, characterized in that the base station apparatus provides priority that is higher than normal to a terminal that comes from a second wireless system, by handover, in which transmission speed is greater than that of the first wireless system.

In addition, a mobile communication system of the present invention is characterized in that the mobile communication system provides priority that is higher than normal to a terminal that performs handover from a first wireless system to a second wireless system in which transmission speed is less than that of the first wireless system.

In addition, a priority setting method of the present invention is characterized by comprising: providing priority that is higher than normal to a terminal that performs handover from a first wireless system to a second wireless system in which transmission speed is less than that of the first wireless system.

In the present invention, priority higher than normal is provided to a terminal performing handover from a wireless system in which transmission speed is high to a wireless system in which transmission speed is low so that abrupt decrease of transmission speed of the terminal can be avoided. By the way, the priority can be restored to normal after a predetermined time elapses in order to avoid occupation of wireless resources by the terminal performing handover from the wireless system in which transmission speed is high to the wireless system in which transmission speed is low.

By the way, the terminal performing handover from the wireless system in which transmission speed is high to the wireless system in which transmission speed is low is provided with priority that is higher than priority to be normally provided to a terminal having the same QoS, SIR, CIR or receiving level, for example.

Effect of the Invention

According to the present invention, a base station apparatus, a terminal, a mobile communication system and a priority setting method for easing abrupt decrease of the transmission speed when performing handover between wireless systems in which transmission speeds are different can be provided.

DESCRIPTION OF REFERENCE SIGNS

100 terminal
110 inter-system handover detection unit
111 receive power measurement unit
112 throughput detection unit
113 handover detection unit
120 application
130 baseband process unit
140 modem
150 transceiver
160 control unit
200, 300 wireless system
400 network
401 scheduler
402 priority determination unit
403 inter-system handover determination unit
404 timer

PREFERRED EMBODIMENTS FOR CARRYING OUT THE INVENTION

In the present invention, for providing priority higher than normal to a terminal that performs handover from a wireless system in which transmission speed is high to a wireless system in which transmission speed is low, following various means are provided.

First, in the present invention, a wireless system of a handover source or a terminal is provided with inter-system handover detection means for determining whether the terminal performs handover between wireless systems, so that handover is detected by the inter-wireless system handover detection means.

A wireless system of a handover destination receives information for determining whether the terminal comes from a wireless system, by handover, in which transmission speed is high. In the present invention, the wireless system of the handover destination is provided with inter-wireless handover determination means for causing priority determination means to determine priority higher than normal for a terminal that comes from a wireless system, by handover, in which transmission speed is high.

Therefore, the priority determination means can determine priority higher than normal for the terminal that comes from the wireless system in which transmission speed is high, and can report the priority to the scheduler. By the way, the inter-wireless system handover determination means can restore the priority to normal after a predetermined time elapses in order to avoid occupancy of wireless resources by the terminal that comes from a wireless system, by handover, in which transmission speed is high.

In addition, the terminal that comes from the wireless system, by handover, in which transmission speed is high may be provided with priority higher than priority that is normally provided to a terminal having the same QoS (Quality of Service), SIR (Signal to Interference Ratio), CIR (Carrier to Interference Ratio), receiving level and the like, for example.

In the following, the best mode for carrying out the present invention is described based on the following embodiments with reference to figures.

Embodiment 1

Figure 1:
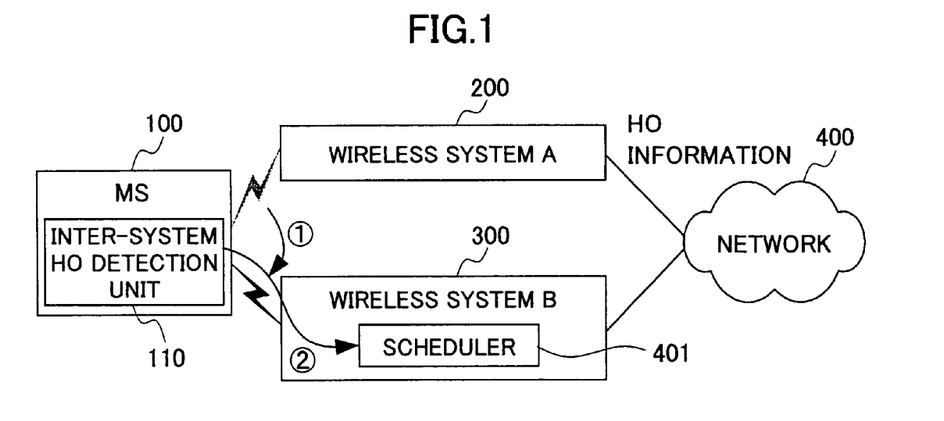
FIG. 1 is a block diagram of an embodiment of a mobile communication system according to the present invention.

FIG. 1 is a block diagram of an embodiment of a mobile communication system according to the present invention. The mobile communication system of FIG. 1 includes a terminal (MS) 100, a wireless system 200, a wireless system 300 and a network (IP network, for example) 400 that interconnects the wireless system 200 and the wireless system 300. In the present embodiment, an example is explained in which the wireless system 200 is a wireless LAN system and the wireless system 300 is a W-CDMA system.

The terminal 100 can communicate with either of the wireless LAN system and the W-CDMA system, and can perform handover between the wireless LAN system and the W-CDMA system. That is, when the terminal 100 performs communication while moving, the terminal 100 can automatically switches connecting wireless LAN system or W-CDMA system.

Figure 2:
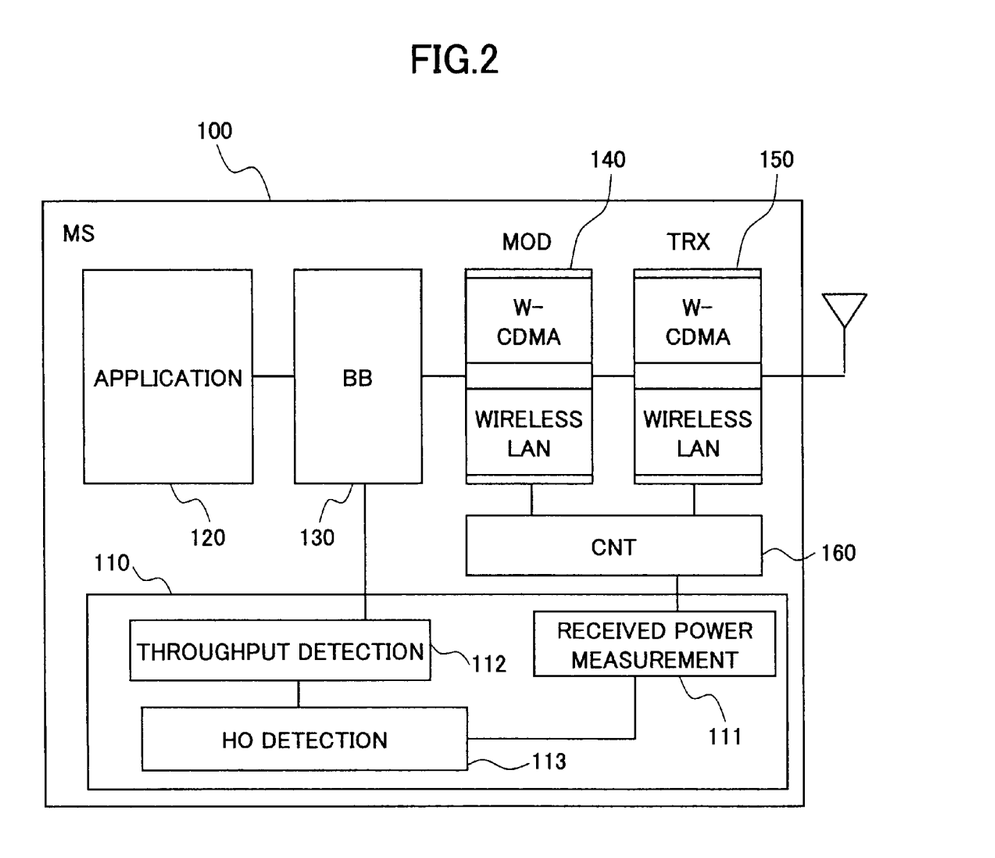
FIG. 2 is a block diagram of an embodiment of a terminal according to the present invention.

FIG. 2 is a block diagram of an embodiment of a terminal according to the present invention. The terminal 100 includes an inter-system handover detection unit (inter-system HO detection unit) 110, an application 120, a baseband process unit (BB) 130, a modem (MOD) 140, a transceiver (TRX) 150 and a control unit (CNT) 160. In addition, the inter-system handover detection unit 110 includes a received power measurement unit 111, throughput detection unit 112 and a handover detection unit (HO detection unit) 113.

The terminal 100 includes the modem 140 and the transceiver 150 for each of the wireless LAN system and the W-CDMA system in order to perform communications for either of the wireless LAN system and the W-CDMA system. The terminal 100 controls the modem 140 and the transceiver 150 for each of the wireless LAN system and the W-CDMA system by the control unit 160 to perform communication.

In the present embodiment, although an example is explained in which the communication unit 160 selects either one of the wireless LAN system and the W-CDMA system, the terminal can communicate with the wireless LAN system and the W-CDMA system at the same time by independently implementing two systems for the wireless LAN system and the W-CDMA system.

In addition, the terminal 100 detects handover between the wireless LAN system and the W-CDMA system by the inter-system handover detection unit 110. The inter-system handover detection unit 110 measures received power or throughput of the wireless LAN system and the W-CDMA system by the received power measurement unit 111 or the throughput detection unit 112 so as to determine whether to perform handover between the wireless LAN system and the W-CDMA system by the handover detection unit 113 and report predetermined information to the wireless LAN system or to the W-CDMA system that is a handover destination.

More particularly, the inter-system handover detection unit 110 reports, to the wireless LAN system or the W-CDMA system that is a handover destination, QoS information indicating service quality in a network, and inter-system handover information including information (SIR, CIR, receive level, maximum transmission speed, average transmission speed and the like) of the wireless LAN system or the W-CDMA system that is a handover source.

Here, an example is explained in which the terminal 100 performs handover from the wireless system 200 in which transmission speed is high to the wireless system 300 in which transmission speed is low. When the inter-system handover detection unit 110 of the terminal 100 determines to perform handover from the wireless system 200 that is a wireless LAN system to the wireless system 300 that is a W-CDMA system, the inter-system handover detection unit 110 reports the before-mentioned QoS information and the inter-system handover information to a base station (base station apparatus) or a network control station that is included in the wireless system 300 that is a W-CDMA system.

Figure 3:
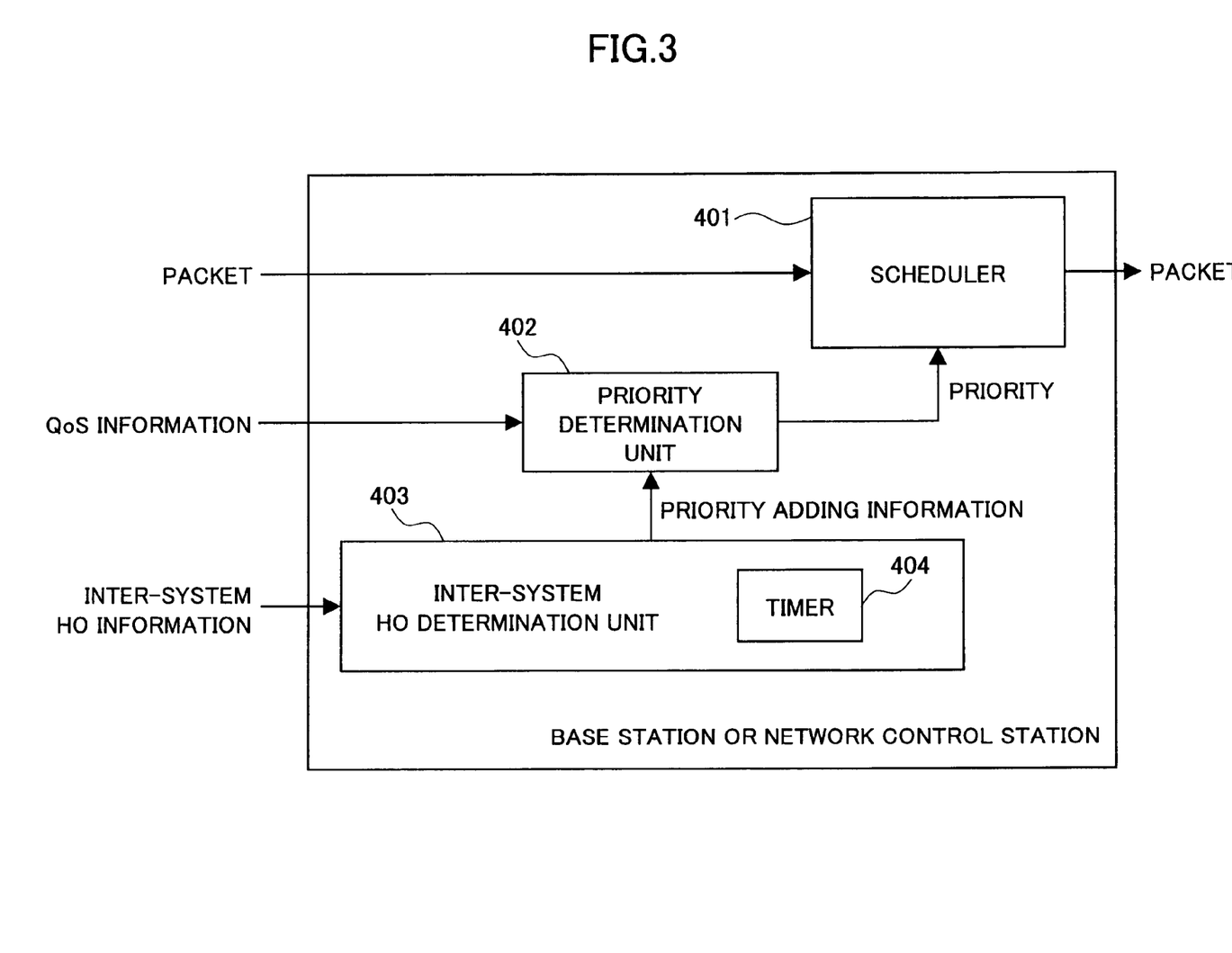
FIG. 3 is a block diagram of an embodiment of the base station or the network control station.

FIG. 3 is a block diagram of an embodiment of the base station or the network control station. The base station or the network control station includes a scheduler 401, a priority determination unit 402, an inter-system handover determination unit 403.

The inter-system handover determination unit 403 receives the before-mentioned inter-system handover information from the terminal 100, and determines that there is handover from the wireless system 200 having high transmission speed based on the inter-system handover information.

Since the inter-system handover determination unit 403 determines that there is handover from the wireless system 200 in which transmission speed is high, the inter-system handover determination unit 403 sends priority adding information to the priority determination unit 402. The priority determination unit 402 determines priority of the terminal 100 based on the QoS information received from the terminal 100 and the priority adding information received from the inter-system handover determination unit 403.

More particularly, the priority determination unit 402 determines the priority of the packet received from each terminal based on QoS information received from the terminal. The priority determination unit 402 determines priority of the terminal 100 for which priority adding information indicating increase of priority is received to be higher than that of other terminals having the same QoS. That is, the priority determination unit 402 assigns priority that is higher than normal to the terminal 100 that comes from the wireless system 200 in which transmission speed is high.

The priority determination unit 402 sends determined priority of each terminal to the scheduler 401. The scheduler 401 performs scheduling for packets received from each terminal based on priority of each terminal received from the priority determination unit 402 so as to send the packets.

Since priority that is higher than normal is assigned to the terminal 100, packets from the terminal 100 are transmitted more preferentially than normal. Thus, even though handover is performed from the wireless system 200 in which transmission speed is high to the wireless system 300 in which transmission speed is low, decrease of transmission speed can be eased.

Figure 4:
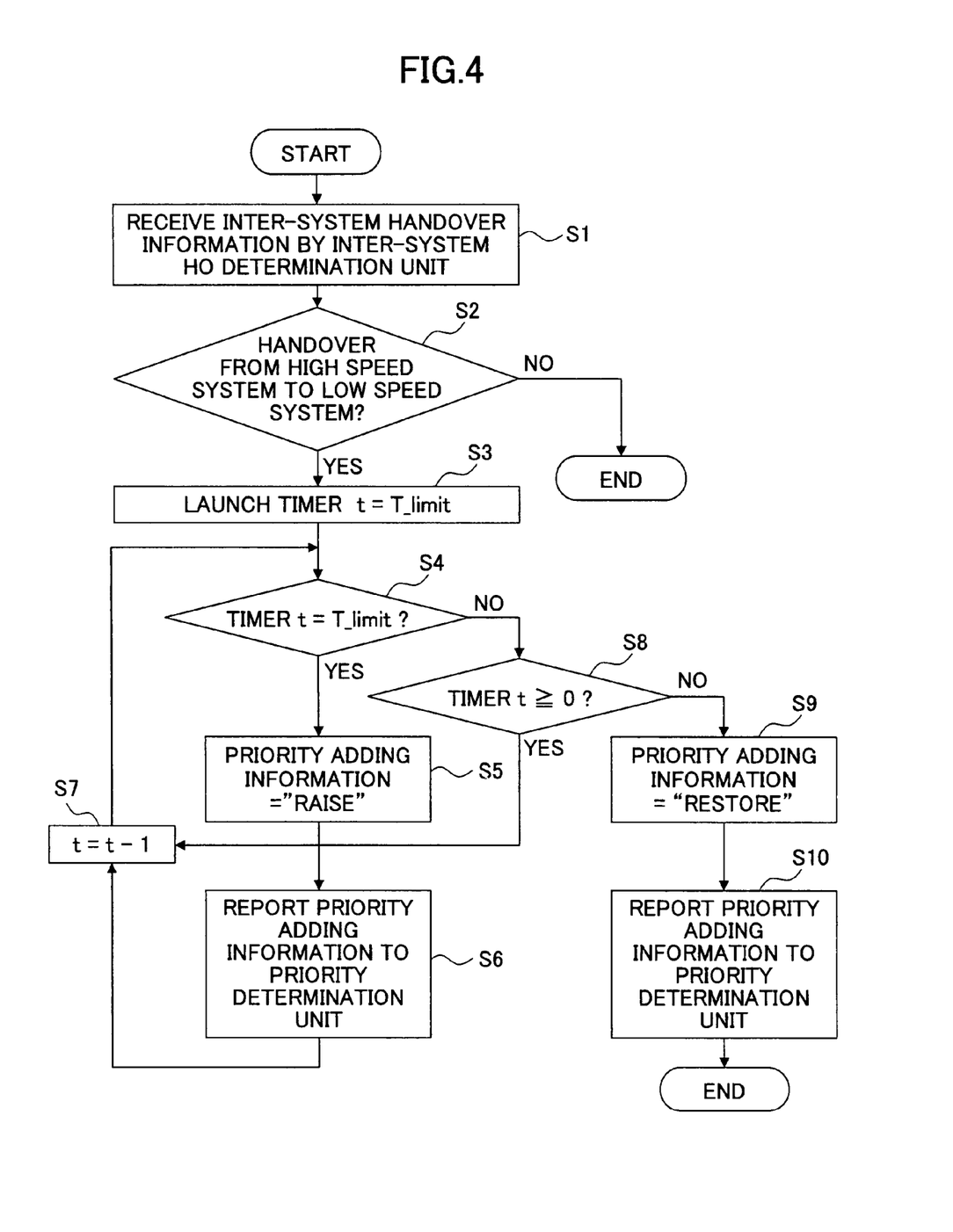
FIG. 4 is a flowchart showing an example of a process procedure of the inter-system handover determination unit.

FIG. 4 is a flowchart showing an example of a process procedure of the inter-system handover determination unit. Going to step S1, the inter-system handover determination unit 403 receives the before mentioned inter-system handover information from the terminal 100.

Going to step S2, the inter-system handover determination unit 403 determines whether there is handover from a wireless system in which transmission speed is high to a wireless system in which transmission speed is low based on the inter-system handover information.

When it is determined to be handover from the wireless system in which transmission speed is high (Yes in S2), the inter-system handover determination unit 403 goes to step S3 to launch a timer 404 and set a period T_limit during which priority is raised into a value t of the timer 404.

On the other hand, when the handover is not one from the wireless system in which transmission speed is high (NO in S2), the inter-system handover determination unit 403 ends the process of the flowchart shown in FIG. 4.

Going to step S4 after step S3, the inter-system handover determination unit 403 determines whether the value t of the timer 404 is the same as the period T_limit. When the value t of the timer 404 is the same as the period T_limit (Yes in S4), the inter-system handover determination unit 403 goes to step S5 to set the priority adding information to be "raise".

That is, in step S4 that is right after the period T_limit is set into the value t of the timer 404 by the process of step S3, it is determined that the value t of the timer is the same as the period T_limit so that the priority adding information is set to be "raise" in step S5.

Going to step S6, the inter-system handover determination unit 403 reports the priority adding information in which "raise" is set to the priority determination unit 402. Going to step S7, the timer 404 decreases the value t by 1. Then, the inter-system handover determination unit 403 returns to step S4 from step S7.

On the other hand, when the value t of the timer 404 is not the same as the period T_limit (No in S4), the inter-system handover determination unit 403 goes to step S8, and determines whether the value t of the timer 404 is equal to or greater than 0. When the value t of the timer 404 is equal to or greater than 0 (Yes in S8), the timer 404 decreases the value t by 1 in step S7. Then, the inter-system handover determination unit 403 returns to step S4 from step S7.

When the value t of the timer 404 is not equal to or greater than 0 (No in S8), the inter-system handover determination unit 403 goes to step S9 to set the priority adding information to be "restore".

That is, in step S8 after the period T_limit set in step S3 during which priority is raised elapses, it is determined that the value t of the timer 404 is not equal to or greater than 0, so that the priority adding information is set to be "restore" in step S9.

Going to step S10 following step S9, the inter-system handover determination unit 403 reports the priority adding information in which "restore" is set to the priority determination unit 402. After that, the process of the flowchart shown in FIG. 4 ends.

Figure 5:
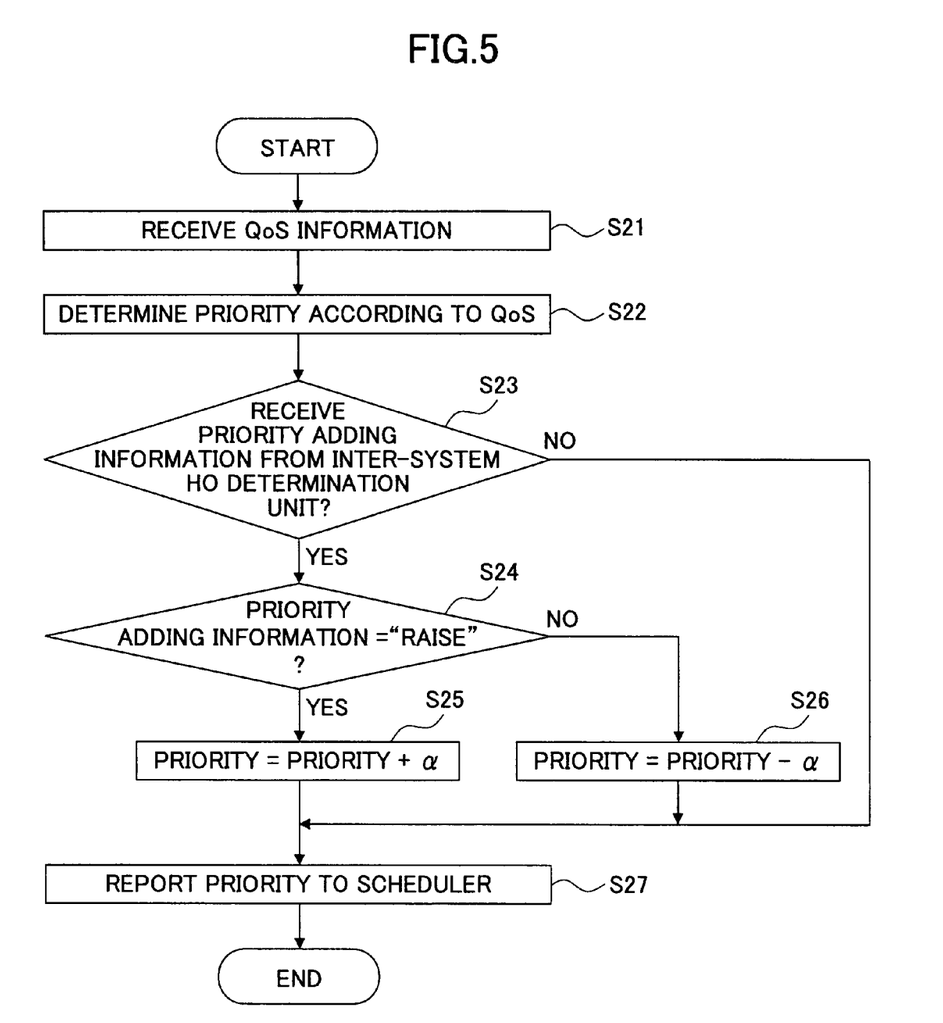
FIG. 5 is a flowchart showing an example of a process procedure of the priority determination unit.

FIG. 5 is a flowchart showing an example of a process procedure of the priority determination unit. Going to step S21, the priority determination unit 402 receives the before-mentioned QoS information from the terminal 100. Going to step S22, the priority determination unit 402 determines priority according to the received QoS information. For example, the priority determination unit 402 can refer to a table in which QoS information is associated with priority to determine priority according to the received QoS information.

Going to step S23, the priority determination unit 402 determines whether it receives the priority adding information from the inter-system handover determination unit 403. When it is determined that it receives the priority adding information (Yes in S23), the priority determination unit 402 goes to step S24 to determine whether "raise" is set in the received priority adding information.

When "raise" is set in the received priority adding information (Yes in S24), the priority determination unit 402 goes to step S25 to raise the priority of the terminal by a predetermined value α and go to step S27.

On the other hand, when "raise" is not set in the received priority adding information (No in S24), since "restore" is set in the received priority adding information, the priority determination unit 402 goes to step S26 to restore the priority to normal according to QoS information by lowering the priority of the terminal, by the predetermined value α, which was raised by the predetermined value α in the previous step S25, and goes to step S27. By the way, in step S23, when the priority adding information is not received (No in S23), the priority determination unit 402 goes to step S27.

In step S27, after the priority determination unit 402 reports priority of each terminal to the scheduler 401, the process of the flowchart shown in FIG. 5 ends.

Next, as an example of scheduling performed by the scheduler 401, scheduling that uses HSDPA (High Speed Downlink Packet Access) of the W-CDMA system is described.

Priority is represented by MCS (Modulation and Coding Scheme). For example, a MCS set shown in table 1 is used. Number of code multiplications is 1. In addition, as the QoS information, quality of wireless propagation environment is used.

TABLE 1

| Example of MCS (3GPP TR 25.848 Table 33) | | | | | | | |
|---|---|---|---|---|---|---|---|
| Chip Rate = 3.84 Mcps | | | SF = 32 | | | | |
| 20 codes | | | 1 code | | | | |
| | Info Rate | Info bits/frame | | Info Rate | Info bits/frame | | Frame Size = 0.67 ms |
| MCS | (Mbps) | (bits) | (octets) | (Mbps) | (bits) | (octets) | Code rate | Modulation |
| 7 | 10.8000 | 7200 | 900 | 0.54 | 360 | 45 | 3/4 | 64 |
| 6 | 7.2000 | 4800 | 600 | 0.36 | 240 | 30 | 3/4 | 16 |
| 5 | 4.8000 | 3200 | 400 | 0.24 | 160 | 20 | 1/2 | 16 |
| 4 | 5.4000 | 3600 | 450 | 0.27 | 180 | 22.5 | 3/4 | 8 |
| 3 | 3.6000 | 2400 | 300 | 0.18 | 120 | 15 | 3/4 | 4 |
| 2 | 2.4000 | 1600 | 200 | 0.12 | 80 | 10 | 1/2 | 4 |
| 1 | 1.2000 | 800 | 100 | 0.06 | 40 | 5 | 1/4 | 4 |

Figure 6:
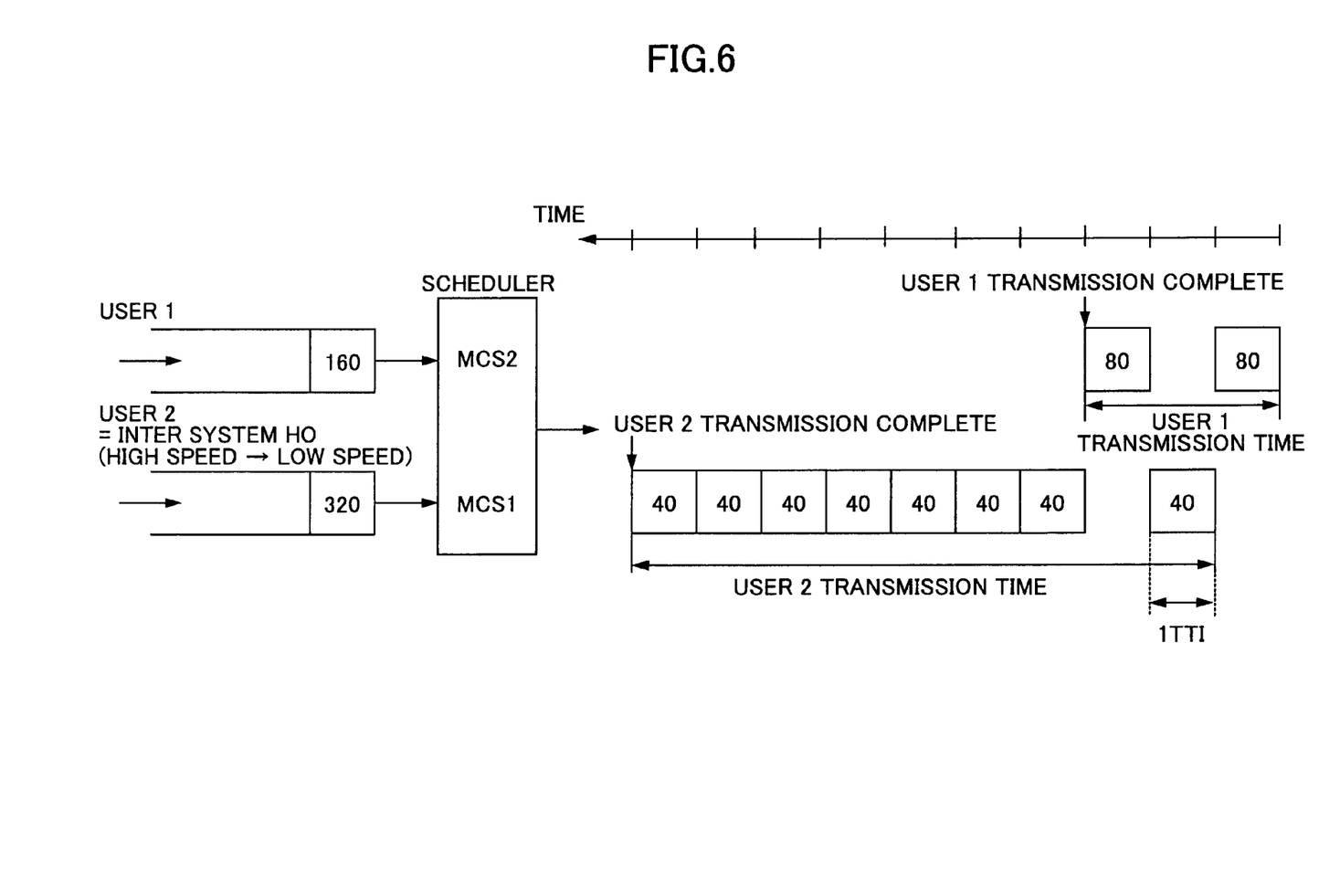
FIG. 6 is an image diagram showing scheduling in a conventional mobile communication system.

FIG. 6 is an image diagram showing scheduling of a conventional mobile communication system. In addition, FIG. 7 is an image diagram showing scheduling in a mobile communication system of the present invention.

User 1 indicates a terminal of a user that resides in a cell X of the W-CDMA system from the beginning. User 2 indicates a terminal of a user that comes to the cell X of the W-CDMA system from the wireless LAN system by handover. Here, it is assumed that the user 2 comes by handover while performing high speed communication in the wireless LAN system and that data amount of the user 2 is greater than that of user 1.

Figure 7:
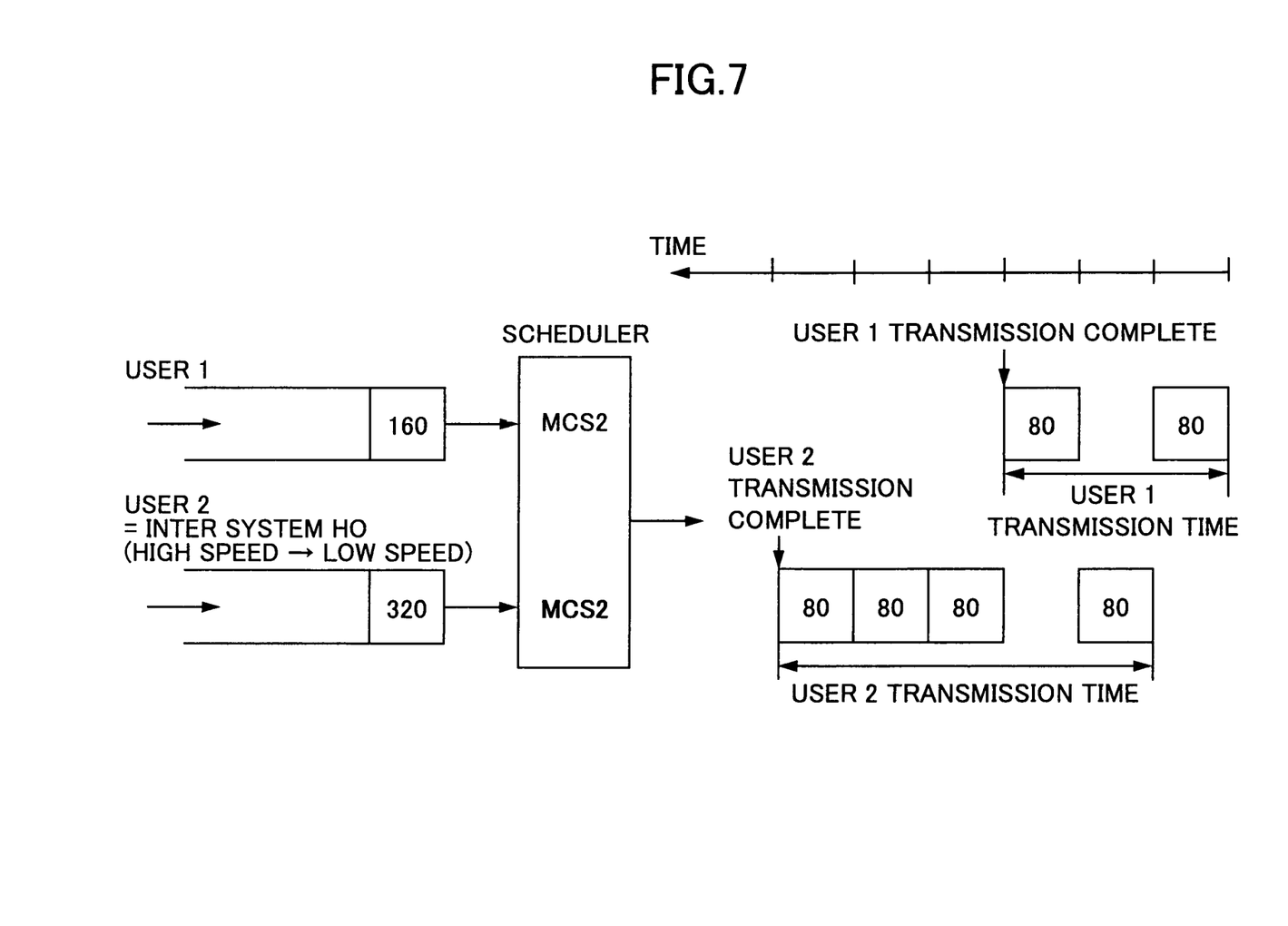
FIG. 7 is an image diagram showing scheduling in a mobile communication system of the present invention.

Data sent to each user waits for transmission assignment by the scheduler as shown in FIGS. 6 and 7. The scheduler assigns transmission right to each user for each 1 TTI (Transmission Time Interval). In addition, the scheduler determines a data amount per 1 TTI according to MCS obtained by propagation environment and the like between the terminal and the base station.

In FIG. 6, MCS 2 is assigned to the user 1 and MCS 1 is assigned to the user 2. From the table 1, the data amount per 1 TTI is 40 bits for MCS 1 and is 80 bits for MCS 2 when the number of code multiplications is 1.

When it is assumed that transmission right is assigned to each user in order, scheduling becomes one as shown in FIG. 6 in the conventional mobile communication system. That is, transmission completes after 9 TTIs from start of transmission.

On the other hand, as shown in FIG. 7, MCS 1 is assigned to each of the user 1 and the user 2. In the present invention, MCS that is higher than normal is selected for a terminal of a user that comes from a wireless system in which transmission speed is high by handover. From the table 1, the data amount per 1 TTI is 80 bits for MCS 2 when the number of code multiplications is 1.

When it is assumed that transmission right is assigned to each user in order, scheduling becomes one as shown in FIG. 7 in the mobile communication system of the present invention. That is, transmission data amount per 1 TTI becomes large so that transmission completes after 5 TTIs from the start of transmission.

As mentioned above, in the scheduling in the mobile communication system of the present invention, priority that is higher than normal is given to a terminal that comes, by handover, to a wireless system in which transmission speed is low from a wireless system in which transmission speed is high, so that abrupt decrease of transmission speed can be eased.

By the way, although an example in which the inter-system handover detection unit 110 is provided in the terminal 100 is described in the present embodiment, it may be provided in an access point or a network control station included in the wireless system 200 that is the handover start point, for example.

In this case, the QoS information and the inter-system handover information reported to the wireless system 300 that is a handover destination from the inter-system detection unit 110 may be transmitted via the network 400 or may be transmitted via the terminal 100.

In addition, although an example is described in which priority is lowered (restored) at one time in the flowchart of FIG. 5 in the present embodiment, it may be lowered in a stepwise fashion. The present invention is not limited to the specifically disclosed embodiments, and variations and modifications may be made without departing from the scope of the invention.

The invention claimed is:

1. A base station apparatus included in a first wireless system, comprising:
a determination unit configured to detect whether a transmission speed of a second wireless system is greater than that of the first wireless system, to determine priority to be provided for a terminal based on the transmission speed of the second wireless system from which the terminal performed handover, so as to provide the terminal in the first wireless system with priority that is higher than priority corresponding to a QoS of the terminal in the first wireless system upon detecting the transmission speed of the second wireless system being greater than that of the first wireless system, and to provide the terminal in the first wireless system with the priority corresponding to the QoS of the terminal in the first wireless system upon detecting the transmission speed of the second wireless system being not greater than that of the first wireless system, the transmission speed of the first wireless system being different from the transmission speed of the second wireless system, the priority being a parameter responsive to the QoS, and the priority being a parameter represented by a modulation and coding scheme.

2. The base station apparatus as claimed in claim 1, wherein the determination unit provides priority higher than priority corresponding to a QoS of the terminal to the terminal that comes from the second wireless system, by handover, in which transmission speed is greater than that of the first wireless system, the base station apparatus provides the priority corresponding to a QoS of the terminal to the terminal after a predetermined time elapses.

3. The base station apparatus as claimed in claim 1, wherein the determination unit receives information on the second wireless system from another base station apparatus included in the second wireless system before the terminal comes from the second wireless system by handover.

4. A base station apparatus included in a first wireless system, comprising:
a determination unit configured to detect whether a transmission speed of a second wireless system is greater than that of the first wireless system, to determine priority to be provided for a terminal based on the transmission speed of the second wireless system from which the terminal performed handover, so as to provide priority that is higher than priority corresponding to a QoS of the terminal for the terminal upon detecting the transmission speed of the second wireless system being greater than that of the first wireless system, and to provide the priority corresponding to the QoS of the terminal for the terminal upon detecting the transmission speed of the second wireless system being not greater than that of the first wireless system, the transmission speed of the first wireless system being different from the transmission speed of the second wireless system, the priority being a parameter responsive to the QoS, and the priority being a parameter represented by a modulation and coding scheme, wherein the determination unit serves as a priority determination unit configured to determine the priority to be provided to the terminal and report the priority to a scheduler, and the base station apparatus further comprises an inter-wireless system handover determination unit configured to receive information on the second wireless system from another base station apparatus included in the second wireless system before the terminal comes from the second wireless system by handover, determine to raise the priority to be provided to the terminal based on the information when transmission speed of the second wireless system is greater than that of the first wireless system, and cause the priority determination unit to raise the priority to be provided to the terminal for a predetermined time.

5. A mobile communication system, comprising:
a first wireless system; and
a second wireless system,
wherein the first wireless system includes a base station apparatus including a determination unit configured to detect whether a transmission speed of the second wireless system is greater than that of the first wireless system, to determine priority to be provided for a terminal based on the transmission speed of the second wireless system from which the terminal performed handover, so as to provide the terminal in the first wireless system with priority that is higher than priority corresponding to a QoS of the terminal in the first wireless system upon detecting the transmission speed of the second wireless system being greater than that of the first wireless system, and to provide the terminal in the first wireless system with the priority corresponding to the QoS of the terminal in the first wireless system upon detecting the transmission speed of the second wireless system being not greater than that of the first wireless system, the transmission speed of the first wireless system being different from the transmission speed of the second wireless system, the priority being a parameter responsive to the QoS, and the priority being a parameter represented by a modulation and coding scheme.

6. A priority setting method in a first wireless system, comprising:

detecting whether a transmission speed of a second wireless system is greater than that of the first wireless system;

determining priority to be provided for a terminal based on the transmission speed of the second wireless system from which the terminal performed handover; and providing the terminal in the first wireless system with priority that is higher than priority corresponding to a QoS of the terminal in the first wireless system upon detecting the transmission speed of the second wireless system being greater than that of the first wireless system, and providing the terminal in the first wireless system with the priority corresponding to the QoS of the terminal in the first wireless system upon detecting the transmission speed of the second wireless system being not greater than that of the first wireless system, the transmission speed of the first wireless system being different from the transmission speed of the second wireless system, the priority being a parameter responsive to the QoS, and the priority being a parameter represented by a modulation and coding scheme.

* * * * *